United States Patent
Liao et al.

(10) Patent No.: US 9,032,034 B2
(45) Date of Patent: May 12, 2015

(54) METHOD AND COMPUTER DEVICE FOR INSERTING ATTACHMENTS INTO ELECTRONIC MESSAGE

(75) Inventors: Shen-Jai S J Liao, New Taipei (TW); Bor-Ping Pan, Taipei (TW); Jenny Tsai, Taipei (TW); Jacqueline Li-Ling Yen, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/597,550

(22) Filed: Aug. 29, 2012

(65) Prior Publication Data

US 2013/0073640 A1 Mar. 21, 2013

(30) Foreign Application Priority Data

Aug. 30, 2011 (TW) .............................. 100131056 A

(51) Int. Cl.
  *G06F 15/16* (2006.01)
  *H04L 12/58* (2006.01)

(52) U.S. Cl.
  CPC ...................................... *H04L 51/08* (2013.01)

(58) Field of Classification Search
  CPC ........................ H04N 21/4126; H04N 69/329
  USPC .................. 709/204, 206, 217, 219
  See application file for complete search history.

(56) References Cited

U.S. PATENT DOCUMENTS

| | | | | |
|---|---|---|---|---|
| 6,073,133 A * | 6/2000 | Chrabaszcz | ........................... | 1/1 |
| 6,970,908 B1 * | 11/2005 | Larky et al. | .................... | 709/206 |
| 7,503,007 B2 * | 3/2009 | Goodman et al. | ............. | 715/758 |
| 8,429,141 B2 * | 4/2013 | Brun et al. | ..................... | 707/694 |
| 2004/0172450 A1 | 9/2004 | Edelstein et al. | | |
| 2007/0100946 A1 * | 5/2007 | Kairis, Jr. | ...................... | 709/206 |
| 2009/0319618 A1 | 12/2009 | Affronti et al. | | |
| 2012/0303729 A1 * | 11/2012 | Li et al. | ......................... | 709/206 |

FOREIGN PATENT DOCUMENTS

| | | |
|---|---|---|
| CN | 1588867 A | 3/2005 |
| CN | 101263495 A | 9/2008 |
| CN | 102075449 A | 5/2011 |

* cited by examiner

*Primary Examiner* — Viet Vu
(74) *Attorney, Agent, or Firm* — Holland & Knight LLP; Brian J. Colandreo, Esq.; Jeffrey T. Placker, Esq.

(57) ABSTRACT

A method for inserting attachments into an electronic message is provided. The method may include searching a keyword database to determine if a content of the electronic message includes a keyword, a key phrase, or a key sentence defined in the keyword database. The method may also include applying a condition to a file database, if the determination is affirmative, so as to search for at least a candidate item. The candidate item may be presented in a menu to the user. The method may further include enabling, in response to the user's confirmation of the candidate item, the confirmed candidate item to be inserted into the electronic message automatically to become an attachment thereto.

14 Claims, 3 Drawing Sheets

METHOD AND COMPUTER DEVICE FOR INSERTING ATTACHMENTS INTO ELECTRONIC MESSAGE

This application is based on and claims the benefit of priority from Taiwan Patent Application 100131056, filed on Aug. 30, 2011.

FIELD OF THE INVENTION

The present invention relates to a method and a computer device for inserting attachments into an electronic message.

BACKGROUND

Thanks to the prevalence of the Internet, people equipped with computer devices can send electronic messages to specific or non-specific recipients easily. In this regard, electronic messages include e-mails, instant messages (IMs), or articles published on a specific Website (such as a blog or a social networking Website.) In general, in addition to a text message, an electronic message can include an attachment thereto. The attachment, which comes in the form of a file, such as a picture, an audio, or a spreadsheet, is inserted into the electronic message by the sender.

SUMMARY OF THE INVENTION

An aspect of the present invention is to provide a method and a computer device for inserting attachments into an electronic message.

In an embodiment, a method is provided for inserting attachments into an electronic message, the method being performed on a computer device by a computer program. The method may include, searching, via the computer device, a keyword database to determine if a content of the electronic message includes a keyword, a key phrase, or a key sentence defined in the keyword database. The method may also include applying, via the computer device, a condition to a file database, if the determination is affirmative, so as to search for at least a candidate item and present the candidate item in a menu to a user. The method may further include enabling, via the computer device, in response to a confirmation from the user of the candidate item, the confirmed candidate item to be inserted into the electronic message automatically to become an attachment thereto.

One or more of the following features may be included. The searching and the applying may be executed in real time. The condition may include one of a latest accessed file, a latest revised file, a latest created file, a latest file inserted as an attachment, and a latest sent file.

The applying may further include providing a search field to enable the user to enter at least a search condition for searching the file database. The enabling the confirmed candidate item to be inserted into the electronic message may further include putting a filename of the confirmed candidate item behind the keyword or key sentence in the content automatically.

In another embodiment, a computer device includes a processor, executing an electronic message program. The processor executing the electronic message program may be configured searching a keyword database to determine if a content of the electronic message includes a keyword, a key phrase, or a key sentence defined in the keyword database. The processor executing the electronic message may also be configured for applying a condition to a file database, if the determination is affirmative, so as to search for at least a candidate item and present the candidate item in a menu to a user. The processor executing the electronic message program may further be configured for enabling in response to a confirmation from the user of the candidate item, the confirmed candidate item to be inserted into the electronic message automatically to become an attachment thereto.

One or more of the following features may be included. The searching and the applying may be executed in real time. The condition may include one of a latest accessed file, a latest revised file, a latest created file, a latest file inserted as an attachment, and a latest sent file.

The applying may further include providing a search field to enable the user to enter at least a search condition for searching the file database. The enabling the confirmed candidate item to be inserted into the electronic message may further include putting a filename of the confirmed candidate item behind the keyword or key sentence in the content automatically.

The computer device may further include a storage device for storing the keyword database. The computer device may further include a storage device for storing the file database. The computer device may further include a communication module connected to a server for storing the keyword database. The electronic message program may access the server via the communication module to search the keyword database. The computer device may further include a communication module connected to a server for storing the file database. The electronic message program may access the server via the communication module to search the file database.

BRIEF DESCRIPTION OF THE DRAWINGS

In the following description reference may be made to specific example embodiments that are illustrated in the appended drawings. Understanding that these drawings depict only example embodiments consistent with the present disclosure and are not, therefore, to be considered to be limiting of its scope, the disclosure will be described and explained with additional specificity and detail through the use of the accompanying drawings.

DETAILED DESCRIPTION OF EXAMPLE EMBODIMENTS

Figure 1:
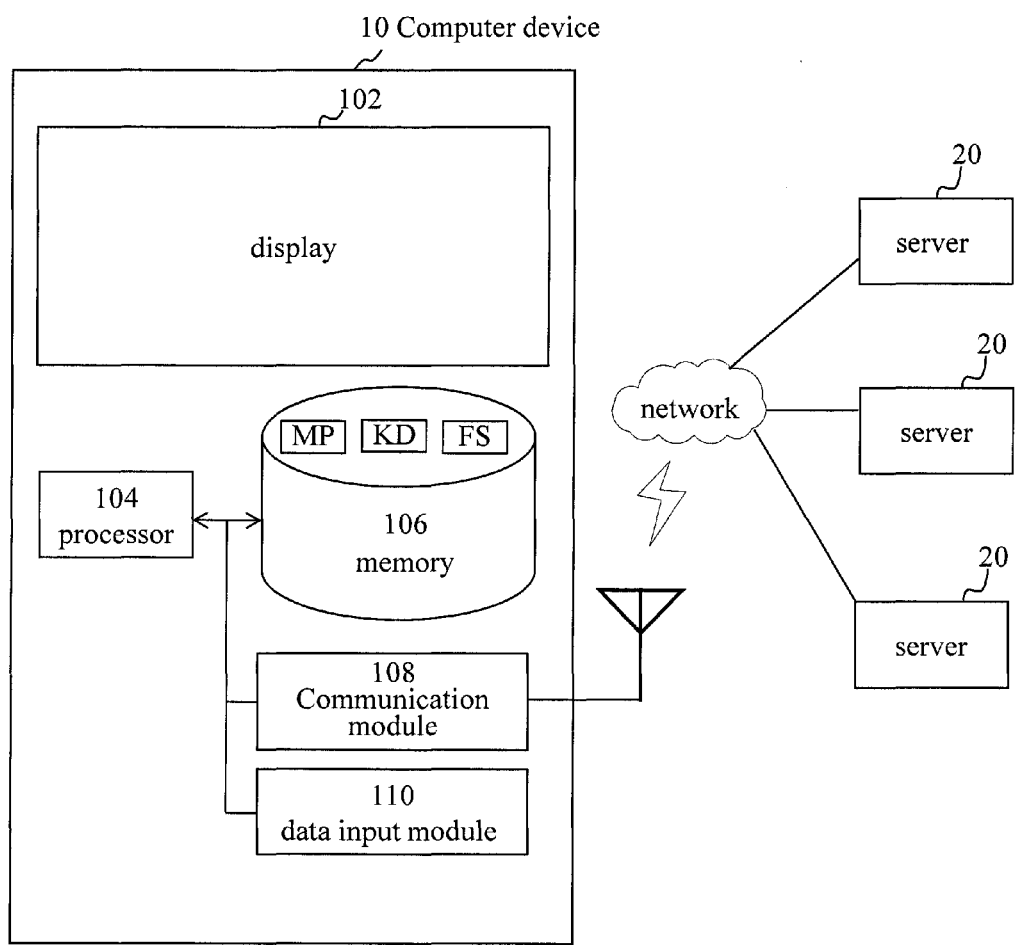
FIG. 1 is a schematic view of a computer device according to an embodiment of the present disclosure.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

As will be appreciated by one skilled in the art, the present disclosure may be embodied as a computer device, a method or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

An embodiment of the present disclosure may allow a user to start an automatic search function with a specific keyword, key phrase, or key sentence while editing a content of an electronic message, so as to specify a required file from a search result directly and finish operating an attachment.

Electronic messages may include, for example, e-mails, instant messages (IMs), articles/messages published on a Website, or electronic messages which allow a user editing the text of a file to insert another file thereinto to become an attachment thereto, such as electronic documents produced with Microsoft WORD®, etc.

Referring now to FIG. 1 through FIG. 3B, computer devices, methods, and computer program products are illustrated as structural or functional block diagrams or process flowcharts according to various embodiments of the present disclosure. The flowchart and block diagrams in the Figures illustrate the architecture, functionality, and operation of possible implementations of systems, methods and computer program products according to various embodiments of the present disclosure. In this regard, each block in the flowchart or block diagrams may represent a (or more than one) module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer Device

Referring to FIG. 1, there is shown a block diagram of a computer device 10 according to an embodiment of the present disclosure. The computer device 10 may include a display 102, a processor 104, a memory 106, a communication module 108, and a data input module 110.

A point to note is that the computer device 10 could be a conventional personal computer, a notebook computer, portable information device, or mobile device (such as a smartphone, tablet computer or the like). An example of a mobile device may include, but is not limited to Apple Inc.'s iPhone® or iPad®, or other mobile computing device.

For example, the processor 104 may be a central processor manufactured by ARM Ltd. and applied to mobile devices.

The memory 106 may be a flash memory for storing the program code of a program MP and being accessed and executed by the processor 104. In some embodiments, the program MP may include and/or be implemented as a client-end program configured for use with, e.g., an email application or email functionality that may be executed by a computing device (such as a native, or other, email application implemented on the iPhone® or iPad® computing devices), or a non-built-in instant messenger program (such as "Imo® instant messenger"). However, the program MP may also be implemented in the form of a web browser (such as Safari®) or an electronic message program for connecting with a specific Website (such as www.gmail.com or www.facebook.com) and therefore may be a server-side, and/or cloud-based, application. However, in an embodiment of the present disclosure. Some example embodiments are described in conjunction with FIG. 2 through FIG. 3B below.

The communication module 108 may provide UMTS-based, GSM-based, or Wi-Fi-enabled network connection, and therefore may be connected to at least one server 20. The data input module 110 may include a digital camera module for inputting image data or barcode data. In an embodiment, the data input module 110 may be integrated with the display 102 to become a touchscreen whereby the user operates the program MP and composes an electronic message.

Computer Device Process Flow

Figure 2:
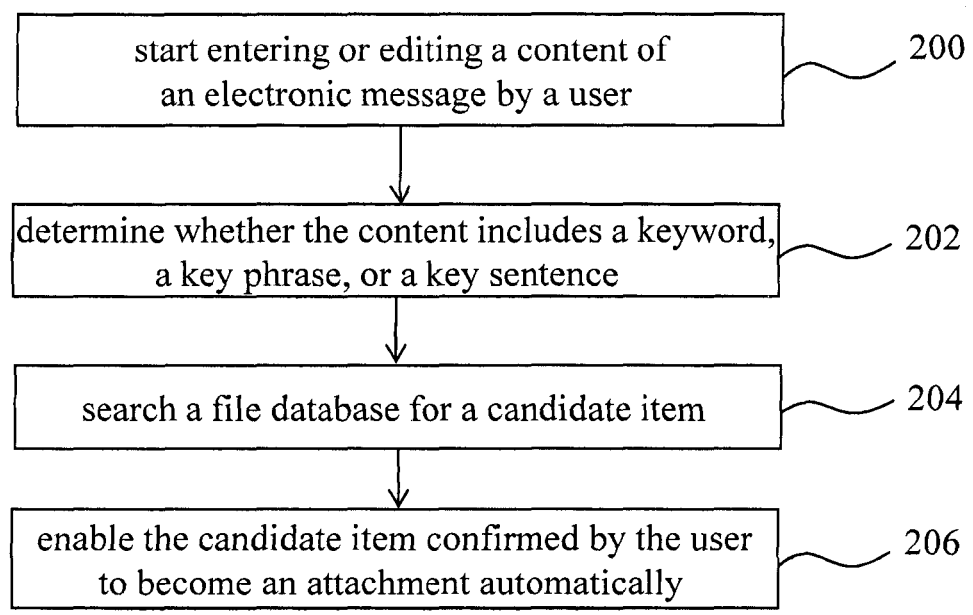
FIG. 2 is a flow chart of a method according to an embodiment of the present disclosure.

Referring to FIG. 2, there is shown a flow chart of a method that may be performed on the computer device 10 based on FIG. 1. In an example embodiment, a method may include:

Block 200: a user may execute an electronic message program MP on the computer device 10 and may start to enter or edit the content of the electronic message. In this embodiment, although the electronic message program MP is an e-mail program, the present invention is not limited thereto.

Block 202: the electronic message program MP may search a keyword database KD according to the content entered or edited by the user to determine whether a text entered by the user includes a keyword, a key phrase, or a key sentence defined in the keyword database KD. For example, a keyword, a key phrase, or a key sentence is "attachment", "as attached", or "please find the attached", respectively. The method may proceed to block 204 if the determination that the text entered by the user includes a keyword, a key phrase, or a key sentence devined in the keyword database KD is affirmative.

Determining whether a text entered by the user includes a keyword or a key sentence defined in the keyword database KD, any suitable conventional techniques of performing spelling and grammar check on a user's entry with a word processing software may be utilized, and/or any techniques described in U.S. Pat. No. 6,970,908 (the entire disclosure of which is incorporated herein by reference) may be utilized.

Keyword database KD may also/alternatively be stored in the memory 106 of the computer device 10. However, the keyword database KD may also be stored in an electronic message server 20 (or any other server not shown) at the remote end and therefore may be accessed by the communication module 108. In an embodiment, the user may be permitted to create a keyword or a key sentence or edit the keywords and key sentences stored in the keyword database KD.

In another embodiment, a keyword or a key sentence may include specific punctuation marks, such as "attachment=", "as attached*", and "please find the attached:". The specific punctuation marks thus included may prevent the program from proceeding to block 204 inadvertently while the user is composing or editing the content of the electronic message.

Block 204: the electronic message program MP may apply a condition to a file database FD, so as to search for at least a candidate item, and may present the candidate item in a menu on an interface of the electronic message program MP to the user.

In an embodiment, the file database FD may not only be stored in the memory 106 of the computer device 10, but may also/alternatively be stored in the server 20 (or any other server not shown) at a remote end, and therefore may be accessed by the communication module 108.

Example functionality of file database FD, may be provided in conjunction with a file management or file search application or module, such as Spotlight Search built in iPhone® or iPad® computing devices, and/or in conjunction with a file management or file search application or module, such as with Google Desktop™, e.g., which may be implemented by a conventional personal computer. While in some embodiments the file database FD may provide a file index and link only, the files and the file database FD may, in some embodiments, actually be stored at different places, as long as the electronic message program MP is able to access any required file by means of the link provided by the file database FD.

In some embodiments, the search performed on the file database FD may not be restricted to filenames. In some embodiments, the search may be performed on the file database FD according to other file-related attributes, such as file size, file format, and file creation/access date and time, or according to author, artist, copyright-related data, album name, track number, length, and encoding mode in case of multimedia files. In this regard, in some embodiments the file database FD may be implemented in conjunction with a media management application, such as Apple's iTune® application. In case of a text-based file, the search may, in some embodiments, be performed on the file database FD according to the content of the file. In short, the present disclosure is applicable to any file-related data for use in a file search.

Block 206: in response to the user's confirmation of the candidate item from a menu, the electronic message program MP may treat the confirmed candidate item as an attachment to the electronic message automatically.

Figure 3A:
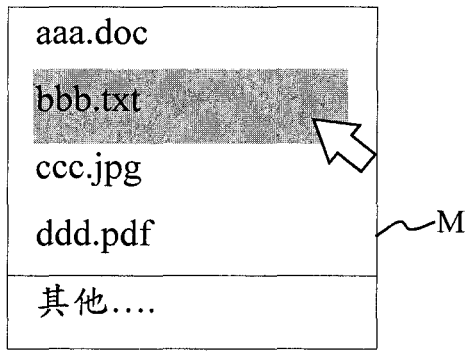
FIG. 3A and FIG. 3B show execution frames in the embodiment of the present disclosure.
Figure 3B:
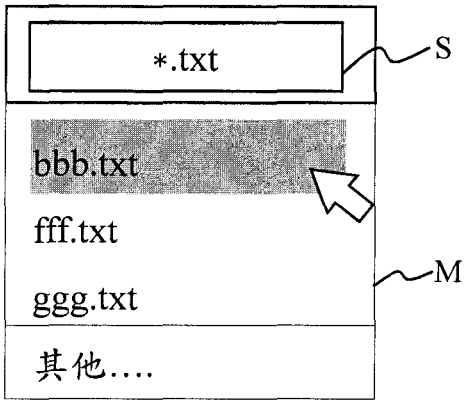

Example embodiments of block 204 and block 206 are described in detail in conjunction with FIG. 3A and FIG. 3B hereunder. In an embodiment, block 202 through block 204 may be executed in real time while the user is composing the content of the electronic message. In an embodiment, block 202 through block 206 may be executed in real time while the user is composing the content of the electronic message. In some embodiments, block 202 through block 204 may be be executed after the user has finished composing the content of the electronic message.

Block 204 and block 206 of FIG. 2 are illustrated with different embodiments below. In the embodiments illustrated with FIG. 3A and FIG. 3B, keywords predefined in the keyword database KD and included in the content entered by the user are shown in bold.

First Example Embodiment

Referring to FIG. 3A, in an embodiment the content entered by the user includes the keyword "attachment". In this embodiment, at block 204 of FIG. 2, the condition of the electronic message program MP is "the latest accessed file", and therefore a menu M displays several latest accessed files in the file database FD in sequence.

Referring to the diagram, the user may select directly from the menu M a file with a filename "bbb.txt" for confirmation, and then the electronic message program MP may treat the file with the filename "bbb.txt" as an attachment to the electronic message automatically (see block 206). Selectively, the electronic message program MP may put the filename "bbb.txt" behind the keyword "attachment", such that the amended keyword reads "attachment [bbb.txt]". Similarly, the condition of the electronic message program MP may also be set to "the latest revised file" or "the latest created file".

Furthermore, the condition of the electronic message program MP may also be set to "the latest file inserted as an attachment". In doing so, the electronic message program MP may include in the file database FD any file inserted by the electronic message program MP lately to become an attachment according to its insertion time.

Furthermore, the condition of the electronic message program MP can also be set to "the latest sent file".

The computer device 10 may include in the file database FD any file inserted by the electronic message program MP lately to become an attachment and transferred or any file transferred by any other file transfer program (such as FTP program) according to its transfer time.

Second Example Embodiment

Referring to FIG. 3B, the content entered by the user may include a key sentence "please find the attached". In this embodiment, at block 204 of FIG. 2, the electronic message program MP may provide a search field S for the user to enter a search condition for searching the file database FD. As shown in FIG. 3B, in the illustrated embodiment the user enters "*.txt" into the search field S, thereby configuring the search condition as any file carrying the filename extension ".txt".

Referring to the diagram, the menu M may display several files carrying the filename extension ".txt" in the file database FD and sorted according to access time, such that the user can select the files from the menu M. The user may select a file with a filename "bbb.txt" from the menu M for confirmation, and then the electronic message program MP may see the file with the filename "bbb.txt" as an attachment to the electronic message automatically (see block 206).

In some embodiments, the electronic message program MP may be configured by the user or according to the default setting for the situation where there is only a file with a filename extension ".txt" (that is, only a "bbb.txt") in the file database FD and thus the search performed by the user yields one and only one result. Therefore, if the search yields one and only one result (that is, only a "bbb.txt"), the "bbb.txt" may be automatically treated as the attachment to the electronic message by the electronic message program MP, without being selected from the menu M by the user.

In some embodiments, the user may enter into the search field S any search condition and search-related syntactic wording which are supported by the file database FD, as the present disclosure is not restrictive thereof.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for inserting attachments into an electronic message, the method being performed on a computer device by a computer program, the method comprising the steps of:
   (a) searching, via the computer device, a keyword database to determine if a content of the electronic message includes a keyword, a key phrase, or a key sentence defined in the keyword database, the keyword, the key phrase, or the key sentence being indicative of a user intent to provide an attachment to the electronic message;
   (b) applying, via the computer device, a condition to a file database, if the determination is affirmative, so as to search for at least a candidate item and present the candidate item in a menu to the user, the condition applied to the file database based upon a file related attribute that is independent of the keyword, the key phrase, or the key sentence, wherein a defined punctuation mark included with at least one of the keyword, the key phrase, or the key sentence indicates not to apply the condition to the file database and search for the candidate item while the user composes the electronic message; and
   (c) enabling, via the computer device, in response to a confirmation from the user of the candidate item, the confirmed candidate item to be inserted into the electronic message automatically to become an attachment thereto.

2. The method of claim 1, wherein the searching and the applying are executed in real time.

3. The method of claim 1, wherein the condition is one of a latest accessed file, a latest revised file, a latest created file, a latest file inserted as an attachment, and a latest sent file.

4. The method of claim 1, wherein the applying further comprises:
   providing a search field to enable the user to enter at least a search condition for searching the file database.

5. The method of claim 1, wherein the enabling the confirmed candidate item to be inserted into the electronic message further comprises:
   putting a filename of the confirmed candidate item behind the keyword or key sentence in the content automatically.

6. A computer device, comprising:
   a processor, executing an electronic message program, configured for:
      (a) searching a keyword database to determine if a content of the electronic message includes a keyword, a key phrase, or a key sentence defined in the keyword database, the keyword, the key phrase, or the key sentence being indicative of a user intent to provide an attachment to the electronic message;

(b) applying a condition to a file database, if the determination is affirmative, so as to search for at least a candidate item and present the candidate item in a menu to the user, the condition applied to the file database based upon a file related attribute that is independent of the keyword, the key phrase, or the key sentence, wherein a defined punctuation mark included with at least one of the keyword, the key phrase, or the key sentence indicates not to apply the condition to the file database and search for the candidate item while the user composes the electronic message; and (c) enabling in response to a confirmation from the user of the candidate item, the confirmed candidate item to be inserted into the electronic message automatically to become an attachment thereto.

7. The computer device of claim 6, wherein the searching and the applying are executed in real time.

8. The computer device of claim 6, wherein the condition is one of a latest accessed file, a latest revised file, a latest created file, a latest file inserted as an attachment, and a latest sent file.

9. The computer device of claim 6, wherein the applying further comprises:

providing a search field to enable the user to enter at least a search condition for searching the file database.

10. The computer device of claim 6, wherein enabling the confirmed candidate item to be inserted into the electronic message further comprises:

putting a filename of the confirmed candidate item behind the keyword or key sentence in the content automatically.

11. The computer device of claim 6, further comprising:
a storage device for storing the keyword database.

12. The computer device of claim 6, further comprising:
a storage device for storing the file database.

13. The computer device of claim 6, further comprising:
a communication module connected to a server for storing the keyword database;
wherein the electronic message program accesses the server via the communication module to search the keyword database.

14. The computer device of claim 6, further comprising:
a communication module connected to a server for storing the file database;
wherein the electronic message program accesses the server via the communication module to search the file database.

* * * * *